United States Patent [19]

Hartley

[11] Patent Number: 4,867,282

[45] Date of Patent: Sep. 19, 1989

[54] VEHICLE ANTI-ROLL BACK DEVICE

[76] Inventor: Brian Hartley, 51 Hady Crescent, Hady Hill, Chesterfield, England

[21] Appl. No.: 151,880

[22] Filed: Feb. 3, 1988

[30] Foreign Application Priority Data

Feb. 5, 1987 [GB] United Kingdom ............... 8702606
May 22, 1987 [GB] United Kingdom ............... 8712155

[51] Int. Cl.⁴ .................... F16D 59/00; B60T 1/00
[52] U.S. Cl. .................... 188/82.1; 188/30; 188/77 R; 192/1.31
[58] Field of Search ............ 188/82.1, 61, 30, 77 R, 188/77 W; 74/144; 192/7, 4 A, 1.31, 1.32

[56] References Cited

U.S. PATENT DOCUMENTS

| | | | |
|---|---|---|---|
| 1,210,444 | 1/1917 | Fallek | 188/30 |
| 2,397,186 | 3/1946 | Lill | 188/82.1 |
| 2,539,545 | 1/1951 | Ljungkull | 188/82.1 |
| 3,923,127 | 3/1974 | Radcliffe et al. | 188/82.1 |
| 4,715,483 | 12/1987 | Hobson et al. | 192/4 A |

FOREIGN PATENT DOCUMENTS 2129077 10/1983 United Kingdom .
2173558 10/1986 United Kingdom ............... 188/82.1

Primary Examiner—Andres Kashnikow
Assistant Examiner—Matthew C. Graham
Attorney, Agent, or Firm—R. A. Giangiorgi

[57] ABSTRACT

The invention relates to an anti-roll back device of particular applicability to motor vehicles but which can be applied to any rotating member where in ordinary useage the rotatable member is required to be rotated in one direction and prevented from rotating in the opposite direction but which has the further capability of being activated to permit the rotation in the opposite direction as and when it is required. This objective is met by a construction comprising engagement structure for association with a rotatable member, said engagement structure being a loop or noose of a flexible material formed from or faced with a friction material, the loop or noose being adapted to pass around said rotatable member from an anchor point to a rotatable spindle and to which the free end of the loop or noose is secured, said spindle being adapted for location in relation to said rotatable member such that rotation of said spindle in one direction puts said loop or noose in a first condition where the loop or noose is caused to slacken to allow free rotation of the rotatable member and rotation of said spindle in the opposite direction puts said loop or moose in a second condition, and in which second condition immediately the said rotatable member attempts to rotate in the opposite direction the said loop or noose can self tighten on said rotatable member to prevent that opposite rotation and there being structure selectively activatable to rotate said spindle in the required direction.

10 Claims, 4 Drawing Sheets

VEHICLE ANTI-ROLL BACK DEVICE

This invention relates to an anti-roll back device, for the selective prevention of reverse rotation of a rotatable member, and is particularly, but not necessarily exclusively concerned with an anti-roll back device for motor vehicles.

In the ordinary way when a vehicle is being driven uphill and is brought to a halt, the handbrake is applied to hold the vehicle stationary. With many vehicles the handbrake is not nearly so efficient as the footbrake and consequently to guarantee preventing the vehicle from rolling backwards, the vehicle may need to be left in gear. When the bringing of a vehicle to a halt is a temporary manoeuvre such as at a junction, at traffic lights, or because of traffic congestion, there is a temptation for the driver to use the clutch and not apply the handbrake. Because the vehicle is held stationary by having the engine driving in a forward gear and by holding the clutch partly open so that there is slip at the clutch plates, this inevitably causes unnecessry wear on the clutch plates. Particularly when a vehicle is being brought to a temporary halt, the possibility of the vehicle rolling backwards is greatly increased with inexperienced drivers, particularly those who are at the learning stage, and it is quite well known that vehicles rolling backwards down a hill is a source of many traffic accidents.

It is equally so that with heavy vehicles e.g. buses and the like, provided with an automatic gear box smooth uphill starts are particularly difficult to achieve. At tick-over speed, the automatic gear box cannot hold the vehicle from rolling back and the braking system must be applied. To set the vehicle in motion, the engine revolutions are increased and the braking system released, with an inevitable short lapse before the road wheels rotate, causing the vehicle to jerk forward before a smooth gradual pick-up of speed occurs.

There are other applications where it would be most undesirable, or even dangerous, if equipment were allowed to move or to rotate in a direction opposite to an intended direction. Thus, for example, if the drive to an uphill conveyor failed, the weight of material on the conveyor would cause a most undesirable reverse movement.

In British Pat. No. 2129077 there is disclosed an anti-roll back device which, in efficient and cost effective manner, alleviates those problems mentioned above, and the object of the present invention is to provide a construction that constitutes an improvement on the constructions disclosed in British Pat. No. 2129077.

According to a first aspect of the present invention an anti-roll back device comprises engagement means for association with a rotatable member, said engagement means being a loop or noose of a flexible material formed from or faced with a friction material, the loop or noose being adapted to pass around said rotatable member from an anchor point to a rotatable spindle and to which the free end of the loop or noose is secured, said spindle being adapted for location in relation to said rotatable member such that rotation of said spindle in one direction puts said loop or noose in a first condition where the loop or noose is caused to slacken to allow free rotation of the rotatable member and rotation of said spindle in the opposite direction puts said loop or noose in a second condition, and in which second condition immediately the said rotatable member attempts to rotate in the opposite direction the said loop or noose can self tighten on said rotatable member to prevent that opposite rotation and there being means to hold the spindle against rotation until selectively activated to permit rotation of said spindle when required.

It will be understood that "rotatable member" is intended to embrace any rotatable shaft lying between a drive and a driven unit, for example the drive shafts of a front wheel drive vehicle or the propelling shaft of a rear wheel drive vehicle, and equally such items as for example a brake drum associated with a wheel of a vehicle whether a driven wheel or a freely rotatable wheel such as for example the rear wheels of a front wheel drive vehicle or the wheels of a trailer vehicle. Equally the invention embraces the application of the anti-roll back device to a drive shaft from a motor to, or other suitable shaft of, a conveyor system, or to the drive shaft or other suitable shaft of static equipment. When the invention is applied to rotatable shafts such as drive shafts or propelling shafts, whilst the loop or noose may be applied directly to such shafts, it is preferred that the loop or noose passes around a brake drum secured coaxially to or concentrically on said shafts.

The means that can be selectively activated to rotate the spindle in its required directions may be electrically operable. Thus when applied to a road vehicle or a trailer vehicle, switch means can be provided associated with the gear lever, which switch can be activated as the gear lever is brought into its reverse position and when said spindle is rotated to put said loop or noose in its inoperative position and when said rotatable means can rotate freely in the opposite direction. Thus, said switch means can activate suitable motor drive means or a solenoid associated with said spindle. It would however be equally possible to employ mechanical, pneumatic or hydraulic means to cause rotation of the spindle, and to provide spring means to cause or assist in the opposite rotation of the spindle.

In one form of construction, an anti-roll back device in accordance with the invention is provided with a main casing surrounding e.g., a brake drum or through which a rotatable shaft extends, there being a slide shoe slidably mounted within said casing and located in relatively close proximity to the surface of the brake drum or the rotatable shaft, the loop or noose being secured to an anchor point at one end of the slide shoe and extending around the brake drum or rotatable shaft to pass around pin means located centrally of the slide shoe and to said spindle rotatable mounted on the slide shoe at the opposite end to said anchor point. Preferably the spindle extends out of the casing at least at one side where it can be acted upon by suitable mechanism to rotate the spindle. Thus, when applied e.g., to a vehicle the mechanism is ordinarily in a position where the spindle has been rotated to tension the loop or noose, but so long as the drive shaft or the brake drum with which the anti-roll back device of the invention is associated is rotating in a "forward" direction, the drive shaft or the brake drum is able to rotate freely within the loop or noose. When the drive shaft or the brake drum attempts to rotate in a "reverse" direction, the slide shoe is urged in the same direction of movement as the attempted reversal of the drive shaft or brake drum to cause the loop or noose to grip tightly on the drive shaft or brake drum and hence prevent its reverse rotation. When a reverse rotation is deliberately required, the drive mechanism for the spindle is activated to rotate the spindle in a direction such that the loop or noose is slackened to such an extent that is sufficient to prevent any load applied to the loop or noose and when there is then no movement of the slide shoe and no tightening of the loop or noose around the drive shaft or brake drum. Advantageously, spring means can be provided between the slide shoe and e.g., a collar on the spindle to take the weight of the slide shoe. This assists in maintaining the loop or noose in a position in relation to the rotatable shaft, such that when rotating in a forward direction, the loop or noose makes marginal contact with the shaft to generate a small amount of heat sufficient to keep the loop or noose dry irrespective as to the prevailing conditions.

Preferably, the free end of the loop or noose is secured to the spindle by providing the spindle with a detachable plate and whereby the free end of the loop or noose can be trapped between the plate and the spindle. With the loop or noose under tension, and particularly when it is subjected to the loading of the rotatable member attempting to rotate in reverse direction, it is preferred to avoid such loads being applied off-centre to the spindle. Thus, it is preferred to provide the spindle with a saddle the upper end of which is parallel to, and co-planar with, the axis of the spindle, and over which saddle the loop or noose is passed before being secured to the spindle by the detachable plate. In a further preferred construction, the saddle and plate are secured to te spindle in such a manner that the shoe and plate can be located thereon at a required position, and when the spindle can project to one side or the other of the shoe and plate to a required degree.

When the spindle is being rotated by its drive mechanism to a condition where the anti-roll back device is active, it is important that the loop or noose is not over-tightened on to the rotatable member and hence hinder its rotation in a "forward" direction. Thus, it is preferred to provide a ratchet wheel on the spindle and pawl on the slide shoe and whereby on rotating the spindle to apply a tension to the belt the slide shoe moves to bring the pawl into contact with the ratchet and prevent further rotation of the spindle.

In a form of construction of particular applicability to heavy duty vehicles, the spindle is secured to and is rotatable by a lever mechanism able to be acted on by a solenoid to allow the loop or noose to be slackened when reverse rotation is required, this form of construction having the advantage of a positive locking of the spindle in its position where the anti-roll back device is active and when reverse rotation of the rotatable member is to be prevented. Thus, a first lever is secured to one end of the spindle, the free end of the first lever being pivotally secured to a second lever, the free end of the second lever being adapted to engage stop means on a third lever pivotally secured to, e.g., a casing containing the anti-roll back device. A fourth lever is provided pivotally secured part-way along the length of the second lever, the free end of the fourth lever also being pivotally secured to, e.g., the casing and having a notch engaged by the end of the first lever. A pivotal cranked lever is additionally provided releasably engaging the end of the third lever. Thus, a solenoid can be provided to act on the cranked lever to swing the cranked lever about its pivot, and release the third lever and hence allow the release of the free end of the second lever from the abutment means on the third lever and allow release of the first lever from the notch in the fourth lever, there being a spring loading on the first and second levers. Thus when a reverse rotation is required and the solenoid activated, e.g., by selecting reverse gear, the rotation of the shaft or brake drum induces a tension in the loop or noose sufficient to rotate the spindle and slaken the loop or noose to a degree where it makes light but unobstrusive contact with the shaft or brake drum, which rotation is permitted by virtue of the fact that the third lever has been released form the cranked lever, and hence the first lever can be rotated and released from the fourth lever, as is swung about its two pivot points to the first lever and the fourth lever and with the fourth lever swung about its pivot point to the casing. It is further preferred that an appropriate spring is provided and which is tensioned by the rotation of the spindle. Thus, when the solenoid is de-activated, and the spindle and thus the first lever rotated by the onset of a forward rotation of the shaft or brake drum a reverse pivoting of the second and fourth levers is caused to bring the free end of the first lever into engagement with the notch in the fourth lever, the free end of the second lever into engagement with the abutment means on the third lever, and which is swung to its original position under its spring loading, and re-engagement of the third lever with the cranked lever acted on by the solenoid.

As the slide shoe is intended to lie in close proximity to the rotatable member, it is preferred to avoid there being any frictional effect as between the slide shoe and the rotatable member. It is therefore preferred to provide the slide shoe with a pad of low friction material to contact the rotatable member and hold the slide shoe in close, but spaced, relationship to the rotatable member.

It is a further advantageous feature to provide a plate spring on the slide shoe to contact the loop or noose and hold the slide shoe at a spacing from the rotatable shaft, to further ensure contact between the loop or noose and the shaft when an attempted reverse rotation is attempted.

According to a second aspect of the present invention, an anti-roll back device for a rotatable member comprises a rotatable spindle adapted to be mounted in fixed spaced parallel relationship to a rotatable member, selectively activatable drive means to rotate the spindle in one or the opposite direction, a slide shoe slidably mounted on the rotatable spindle, and a loop or noose secured to an anchor point towards the end of the slide shoe remote from the rotatable spindle, said loop or noose being adapted to extend around the rotatable member below pin means mounted generally centrally of the slide shoe and to the rotatable spindle where it is there secured, said pin means being mounted on the slide shoe such that it has a permitted movement towards and away from the rotatable member. Preferably, spring means are provided to urge the pin means away from the rotatable member.

Thus, the rotatable spindle is so located in relation to said rotatable member that rotation of said spindle in one direction puts said loop or noose in a first condition where the loop or noose is caused to slacken to allow free rotation of the rotatable member and rotation of said spindle in the opposite direction puts said loop or noose in a second condition, and in which second condition immediately the said rotatable member attempts to rotate in the opposite direction the said loop or noose self-tightens on said rotatable member to prevent that opposite rotation. As the loop or noose tightens, the pin means moves away from the loop or noose to relieve any pressure as between the slide shoe and the rotatable spindle on which it is mounted, and thereby ensures that the slide shoe can move with relative ease to allow the loop or noose to tighten on the rotatable member.

In certain applications there can be the need to hold a rotatable member against rotation in either direction. It is therefore within the scope of the invention to provide two devices in accordance with the invention acting oppositely on the rotatable member with suitable control means to selectively activate one or other of the devices to allow a required rotation in one direction and the prevention of the opposite rotation or to activate both devices whereby to prevent rotation in both directions.

One embodiment of the invention will now be described by way of example only with reference to the accompanying drawings in which.

Figure 5:
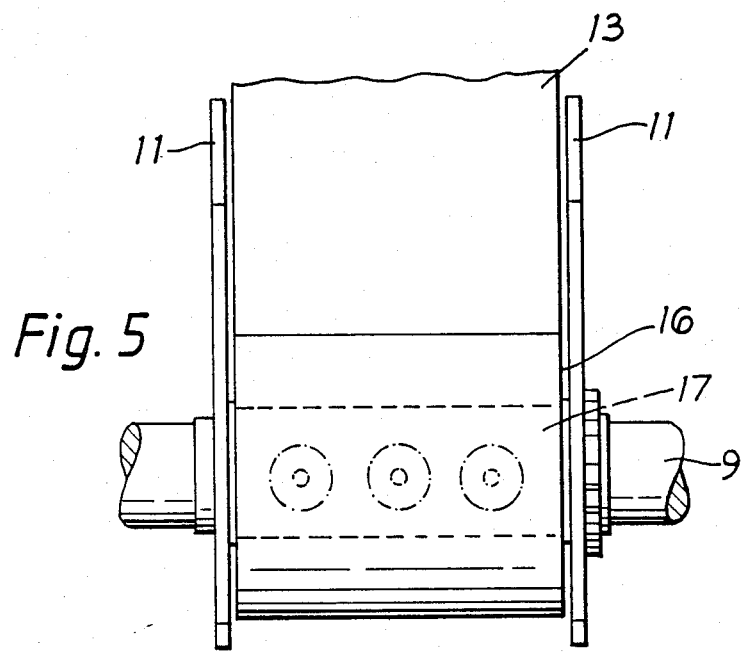
Figure 2:
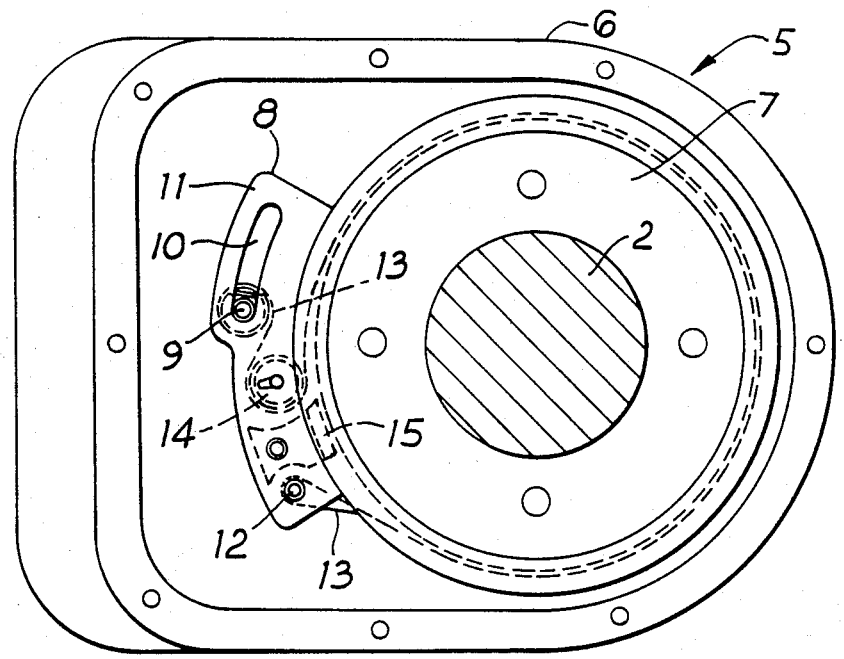
FIG. 2 shows the anti-roll back device of FIG. 1 in a front elevation and with part of the casing removed, and displaying the mechanism in its operative condition.
Figure 3:
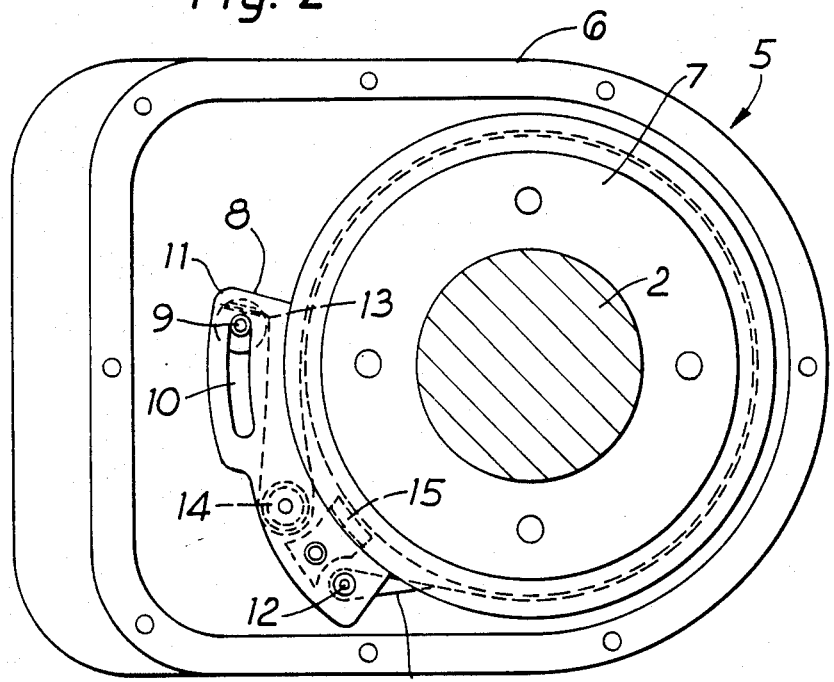
Figure 4:
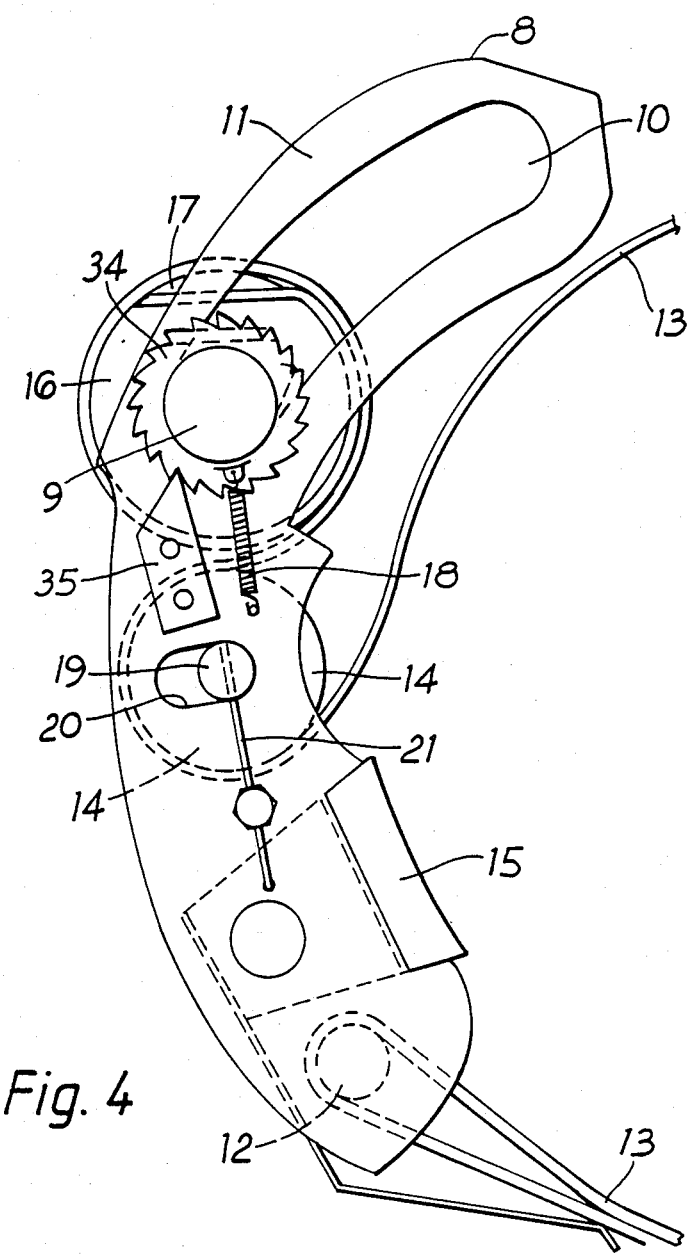
Figure 6:
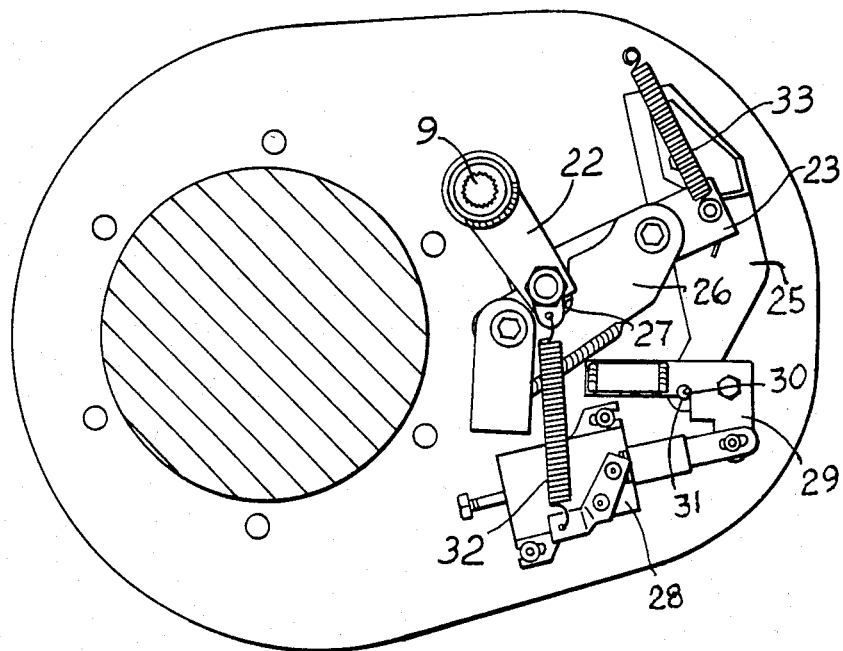
Figure 7:
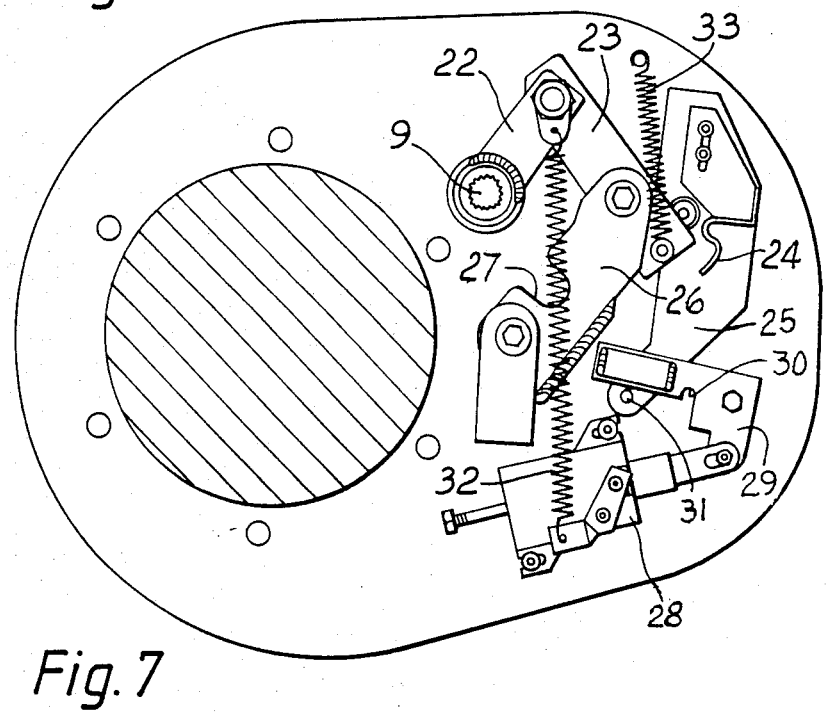

FIG. 3 corresponds to FIG. 2 but displays the mechanism in its inoperative condition;

FIG. 4 is a front elevation of the slide shoe of FIGS. 2 and 3 on an enlarged scale;

FIG. 5 is a side elevation of the slide shoe of FIG. 4;

FIG. 6 is a rear elevation of the anti-roll back device of the invention illustrating one form of drive mechanism for the rotatable spindle of the device in the operative condition; and FIG. 7 corresponds to FIG. 6 but shows the drive mechanism in the operative condition.

Figure 1:
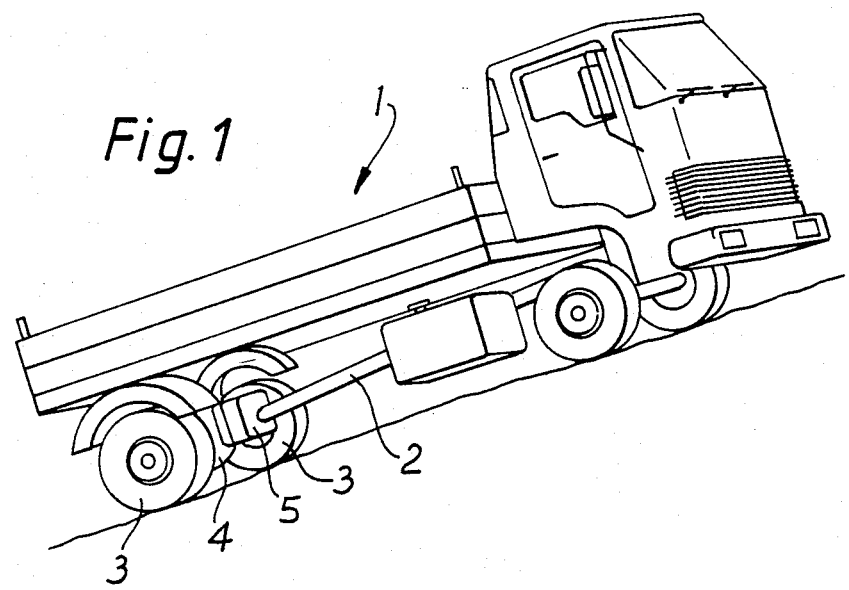
FIG. 1 is a part schematic representation of a vehicle in which the anti-roll back device of the invention is incorporated.

In FIG. 1 is shown a vehicle 1 and in particular a so-called fixed platform vehicle having a rear wheel drive, with a propelling shaft 2 extending from an engine located at the front of the vehicle to the rear wheels 3 via an interposed conventional differential unit 4. Immediately in advance of the differential unit 4, an anti-roll back device 5 is provided to engage either the propelling shaft or a brake drum provided on the propelling shaft as will be described later.

As is illustrated more particularly by FIGS. 2 to 7, the anti-roll back device 5 comprises a casing 6 within which is lcated a brake drum 7 located on the propelling shaft 2. To one side of the brake drum, and in close proximity thereto, a shoe 8 is provided slidably mounted on a spindle 9 which spindle extends into and is supported by appropriate bushes on the front and rear walls of the casing 6, with the spindle passing through co-operating slots 10 in the slide plates 11 of the shoe 8. At the lower end of the slide shoe an anchor point 12 is provided for a belt-like loop 13, which belt-like loop is formed from, or coated or impregnated with a material of a required coefficient of friction. The loop 13 extends around the brake drum 7 to pass below a freely rotatably roller 14 located generally centrally of the slide shoe and between its plates, the loop 13 extending from below the freely rotatable roller 14 and to the spindle 9 where it is then secured as will be described in greater detail below. Also located on the slide shoe is a pad 15 of low friction material to contact the brake drum and assist in holding the slide shoe in its required close spaced relationship to the brake drum.

As is shown more particularly by FIGS. 4 and 5, the loop 13 is secured to the spindle 9 by providing a saddle 16 on the spindle, the saddle having a removable plate 17 to trap the end of the loop 13 to the saddle. More desirably the saddle is secured to the spindle in a manner that permits adjustment of the spindle through the saddle and whereby the spindle can project to one side of the saddle to a required degree. Thus screw means can be provided to lock the saddle onto the spindle with the spindle in the required disposition. To assist in supporting the weight of the slide shoe 8, spring means 18 can be provided between the slide shoe and a collar on the spindle to maintain the slide shoe at a particular position in relation to the brake drum as will be described in more detail below.

FIG. 4 also shows the roller 14 being capable of transverse movement with relation to the slide shoe, by providing the roller with a spindle 19 the ends of which lie in co-operating slots 20 formed in each side plate of the slide shoe. As is further illustrated, spring means 21 are provided between the spindle 19 and the side plates of the slide shoe to assist in urging the spindle in a direction away from the brake drum as will be described in more detail below.

Thus, with the anti-roll back device in its operative condition, as is illustrated in FIG. 2, the slide shoe is in an upper position supported from a collar on the spindle by the spring 18 and such that the spindle 9 is positioned towards the lower end of the slots in the side plates of the slide shoe. In this condition the loop or noose makes light but unobtrusive contact with the brake drum, and a forward driving rotation of the shaft 2 and hence the brake drum applies a small force in a clockwise direction as seen in FIG. 2 to assist in maintaining the slide shoe in its upper position. The maintenance of a light contact between the loop or noose and the brake drum and during forward rotation of the brake drum has the added advantage of generating a small amount of heat in the loop or noose to maintain it dry irrespective as to climatic conditions.

The instant that the shaft 2 and its brake drum attempt to effect a reverse rotation, an opposite anti-clockwise force is applied to the loop or noose sufficient to draw the slide shoe in a downward direction and to a lower position as is illustrated in FIG. 3. By lengthening the distance between the the spindle 9 and the roller 14, the loop or noose is caused to tighten onto the brake drum with a force sufficient to prevent any reverse rotation of the brake drum and hence the rear wheels 3 of the vehicle. As the loop or noose tightens, the spindle 19 and hence the roller 14 can move to the position shown in FIG. 4 against the action of the spring to relieve pressure being applied to the slide shoe and hence prevent the slide shoe from binding on the spindle 9 during movement to the position shown in FIG. 3. The tightening of the loop or noose onto the brake drum is substantially instantanious thereby ensuring that there can be no reverse movement of the vehicle except when it is positively required.

The spindle 9 is connected to a mechanism that positively locks it in position where a reverse rotation of the shaft 2 and hence the road wheels 3 is to be prevented, which mechanism can be activated to permit a reverse rotation when required. Thus, as is illustrated in FIGS. 6 and 7 the spindle 9 projects through a suitable bushed hole in the casing to a lever mechanism and drive solenoid. As shown, a first lever 22 is secured to the projecting end of the spindle 9, the free end of the first lever being pivotally secured to a second lever 23 the free end of which engages step means on a third lever 24 pivotally secured to the casing. A fourth lever 26 is provided, pivotally secured to the casing. A fourth lever 26 is provided, pivotally secured partway along the length of the second lever 23, the opposite end of the fourth lever 24 also being pivotally secured to the casing and having a notch 27 engaged by the end of the first lever 22. A solenoid 28 is provided to act on one arm of a cranked lever 29 pivotally mounted on the casing, the other arm of the cranked lever having a notch 30 engaged by a pin 31 at the end of the third lever 25. In the condition shown in FIG. 6, the lever mechanism is locked against movement, thus preventing any rotation of the spindle 9. When a reverse rotation is required, the solenoid 28 is activated to pivot the cranked lever and release the pin 31 from the notch 30. As the shaft 2 commences a reverse rotation a tension is induced in the loop sufficient to rotate the spindle to release the first lever 22 from the notch 27 in the fourth lever 26 and when the compound movement of the levers releases the second lever 23 from the abutment means 24, and the levers brought to the condition shown in FIG. 7, where they remain for so long as the shaft rotates in the reverse direction, and held in that condition when reverse rotation ceases. Once the solenoid has been deactivated, and a forward rotation of the shaft commenced, the lever mechanism instantly reverts to the FIG. 6 condition assisted by the actions of the spring 32 between the first lever 22 and the solenoid 28, and the spring 33 between the lever 23 and the casing.

To supply power to the solenoid, it is simply the case that the solenoid can be connected to the battery of the vehicle via the reverse light switch customarily provided on vehicles and associated with the gear lever. Thus, as the reverse gear is deliberately selected by the driver, the solenoid is instantly activated, and as reverse rotation of the brake drum commences the lever mechanism instantly moves to its FIG. 7 condition, and on cessation of reverse rotation, this condition is maintained until forward rotation allows the lever mechanism to revert to its FIG. 6 condition under the action of the springs 32 and 33, movement of the gear lever out of reverse gear deactivating the solenoid to lock the lever mechanism in its FIG. 6 condition under the action of the springs 32 and 33.

When the spindle is being rotated by drive mechanism other than the lever mechanism referred to above where a predetermined rotation of the spindle is effected, to a condition where the anti rollback device is activated it is important to ensure that the loop or noose is not overtightened onto the brake drum and which would then hinder the forward rotation of the brake drum and hence drive shaft. Thus, a ratchet wheel 34 is provided on the spindle to be engaged by a pawl 35 secured to the slide shoe, and as the spindle 9 rotates the tightening action on the belt causes the slide shoe to move in an upward direction until such time as the pawl contacts the ratchet wheel and prevents further rotation of the spindle.

I claim:

1. An anti-roll back device having engagement means for association with a rotatable member, said engagement means being a loop of a flexible material comprising a friction material wherein said loop (13) is adapted to pass around said rotatable member (2) from an anchor point on a movable member to a rotatable spindle (9) on which the free end of the loop (13) is secured, said spindle (9) being adapted for location in relation to said rotatable member (2) such that rotation of said spindle in one direction puts said loop in a first condition where said loop is caused to slacken and thereby to allow free rotation of the rotatable member in a first direction and in a second opposite direction, and rotation of said spindle in the opposite direction puts said loop in a second condition where said rotatable member can freely rotate in said first direction and said loop can self-tighten on said rotatable member immediately as said rotatable member attempts to rotate in said second opposite direction and thereby to prevent said opposite rotation, and there being restraining means responsive to rotation of said rotatable member (22-31) to hold said spindle against rotation until selectively activated to permit rotation of said spindle in either of said respective one or opposite directions when required.

2. An anti-roll back device as in claim 1, wherein said spindle is electrically operable.

3. An anti-roll back device as in claim 2, wherein said spindle is permitted to rotate by solenoid means activated by a switch via a lever mechanism, which lever mechanism comprises a first lever secured to one end of said spindle, the free end of said first lever being pivotally secured to a second lever the free end of which is adapted to engage stop means on a third lever pivotally secured to a support, there being a fourth lever pivotally secured to said second lever partway along its length, with the free end of the fourth lever pivotally secured to a support, said fourth lever having a notch for engagement by the free end of said first lever, and there being a further cranked lever acted on by said solenoid the free end of which releasably engages the free end of said third lever.

4. An anti-roll back device as in claim 3, and in its application to motor vehicles, wherein said switch is associated with a gear lever of the motor vehicle.

5. An anti-roll back device as in claim 1, wherein said movable means comprises is a slide shoe slidably mounted on said rotatable spindle, the loop being secured to an anchor point at one end of the slide shoe and adapted to extend around the rotatable member to pass below pin means located centrally of the slide shoe and to said rotatable spindle where it is there secured, said pin means being mounted on said slide shoe such that there is a permitted movement of said pin means towards and away form said rotatable member.

6. An anti-roll back device as in claim 5, wherein spring means are provided to urge said pin means away form said rotatable member.

7. An anti-roll back device as in claim 5, wherein support spring means are provided between said slide shoe and said rotatable spindle to support the weight of said slide shoe.

8. An anti-roll back device as in claim 1, wherein said movable means and said loop are mounted within a casing surrounding said rotatable member, said rotatable spindle being located in bearings in opposite sides of the casing, and said spindle extending out of the casing to one side to be engaged by said means for selectively holding said spindle against rotation.

9. An anti-roll back device as in claim 8, wherein said loop is secured to said rotatable spindle in such a manner that the position of said spindle can be adjusted to project to a greater or a lesser degree out of the casing.

10. An anti-roll back device as in claim 1, wherein excess rotation of said rotatable spindle in a direction to put the device in an operative condition and with consequent overtightening of said loop on said rotatable member is prevented by providing a ratchet wheel on said spindle to be contacted by a pawl on said movable means.

* * * * *